United States Patent [19]

Saito et al.

[11] Patent Number: 5,717,036
[45] Date of Patent: Feb. 10, 1998

[54] FLUORORUBBER COPOLYMER AND CURABLE COMPOSITION THEREOF

[75] Inventors: Hideya Saito; Masanori Kitaichi; Yutaka Ueta; Mitsuru Kishine, all of Settsu, Japan

[73] Assignee: Daikin Industries Ltd., Osaka, Japan

[21] Appl. No.: 687,491

[22] PCT Filed: Dec. 6, 1995

[86] PCT No.: PCT/JP95/02497

§ 371 Date: Oct. 7, 1996

§ 102(e) Date: Oct. 7, 1996

[87] PCT Pub. No.: WO96/17877

PCT Pub. Date: Jun. 13, 1996

[30] Foreign Application Priority Data

Dec. 6, 1994 [JP] Japan ................... 6-302503

[51] Int. Cl.$^6$ .................. C08F 14/16; C08F 14/22; C08F 259/08
[52] U.S. Cl. .................. 525/326.3; 525/326.4; 526/242; 526/247; 526/250; 526/255
[58] Field of Search .................. 525/326.3, 326.4; 526/242, 247, 250, 255

[56] References Cited

U.S. PATENT DOCUMENTS 4,361,678 11/1982 Tatemoto et al. ................... 528/374
4,886,862 12/1989 Kuwamura et al. ................... 526/247

FOREIGN PATENT DOCUMENTS 0199138  10/1986  European Pat. Off. .
0425259A1  5/1991  European Pat. Off. .
0525685A1  2/1993  European Pat. Off. .
2347389  11/1997  France .

*Primary Examiner*—W. Robinson H. Clark
*Attorney, Agent, or Firm*—Birch, Stewart, Kolasch & Birch, LLP

[57] ABSTRACT

A copolymer comprising 0.005 to 1.5 mole % of repeating units derived from an iodine-containing fluorinated vinyl ether, 40 to 90 mole % of repeating units derived from vinylidene fluoride, 3 to 35 mole % of repeating units derived from perfluoro(methyl vinyl ether), optionally up to 25 mole % of repeating units derived from hexafluoropropylene and optionally up to 40 mole % of repeating units derived from tetrafluoroethylene, which is obtained by polymerizing the above monomers in the presence of a diiodide compound, contains iodine atoms introduced in the copolymer from the diiodide compound and the iodine-containing fluorinated vinyl ether in amounts of 0.01 to 1 wt. % and 0.01 to 2 wt. %, respectively, and has a Mooney viscosity of 20 to 150.

10 Claims, No Drawings

FLUORORUBBER COPOLYMER AND CURABLE COMPOSITION THEREOF

FIELD OF THE INVENTION

The present invention related to a fluororubber copolymer and a curable composition thereof. In particular, the present invention relates to a fluororubber copolymer which has an improved sealing property at low temperature while maintaining excellent properties of conventional fluororubbers, and a curable composition comprising said copolymer.

PRIOR ART

Since a fluororubber comprising vinylidene fluoride (VdF) units is excellent in heat resistance, chemical resistance, solvent resistance, oil resistance, and so on, it is molded in the form of an O-ring, a hose, a stem seal, a shaft seal, a diaphragm, and so on and widely used in the fields of automobile industry, semiconductor industry, chemical industry, and the like.

However, it is pointed out that the conventionally used fluororubbers have inferior cold resistance to other rubber materials. In general, with an uncured copolymer, its cold resistance is evaluated in terms of a glass transition temperature, while with a molded article, its cold resistance is evaluated by the Gehman torsion test, the TR test (ASTM D 1329), and the low temperature brittleness test. When the rubber is used as a sealing material such as the O-ring, a degree of liquid leakage at low temperature, that is, a low temperature compression set of the material is a straightforwardly important index.

To improve the cold resistance of the fluororubbers, various studies have been made for a long time. GB Patent Nos. 953,152 and 952,098 proposed the use of a perfluoroalkyl vinyl ether in place of or in addition to a conventional monomer of the fluororubber, and achieved a glass transition temperature of $-30°$ C. or lower. But, the low temperature compression set did not reach a sufficient level.

It is proposed to use a specific iodine compound as a chain transfer agent in the radical polymerization for the production of the fluororubber copolymer, whereby an iodine atom is bonded to a molecular terminal of the copolymer, and to perform a peroxide curing reaction by making use of a high radical activity of the iodine atom (JP-A-53-125491). It is reported that a cured material of a copolymer, which is obtained by using the above technique and polymerizing a monomer mixture having a specific composition, is excellent in the low temperature property (JP-A-6-508161). But, the low temperature property was evaluated only by the Gehman torsion test, and the compression set was measured only at a high temperature ($200°$ C. for 70 hours).

JP-A-62-12734 describes a simple method for producing an iodine-containing peroxide-curable fluororubber which is excellent in the compression set. But, this patent publication does not describe a low temperature compression set and a composition suitable for the low temperature compression set.

JP-B-53-4035 discloses a copolymer comprising vinylidene fluoride (VdF), perfluoro(methyl vinyl ether) (PMVE), hexafluoropropylene (HFP) and tetrafluoroethylene (TFE) and containing 17 to 30 wt. % of PMVE, and FR Patent No. 2347389 discloses a copolymer comprising the same monomers as above and containing 10 to 17 wt. % of PMVE, and both copolymers provide a molded article having good low temperature compression set when they are cured with a polyol. But, as described in JP-A-6-128334, these copolymers suffer from a problem that they tend to foam when they are subjected to the polyol curing. Further, JP-A-6-128334 describes that when a copolymer comprising vinylidene fluoride (VdF), perfluoro(methyl vinyl ether) (PMVE), hexafluoro-propylene (HFP) and tetrafluoroethylene (TFE) and containing 3 to 9 wt. % of PMVE is polyol cured, a molded article having a high compression set at a low temperature ($0°$ C.) is obtained. But, the molded article of this copolymer does not have sufficient tensile strength and elongation at break.

SUMMARY OF THE INVENTION

An object of the present invention is to provide a fluororubber copolymer which has excellent compression set in a wide temperature range from low temperature to high temperature while it maintains the excellent properties of the conventional fluororubbers.

Another object of the present invention is to provide a curing composition suitable for curing such fluororubber copolymer.

According to the present invention, there is provided a copolymer comprising 0.005 to 1.5 mole % of repeating units derived from an iodine-containing fluorinated vinyl ether of the formula:

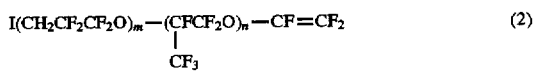

wherein m is an integer of 1 to 5, and n is an integer of 0 to 3, 40 to 90 mole % of repeating units derived from vinylidene fluoride (VdF), 3 to 35 mole % of repeating units derived from perfluoro-(methyl vinyl ether) (PMVE), 0 to 25 mole % of repeating units derived from hexafluoropropylene (HFP) and 0 to 40 mole % of repeating units derived from tetrafluoroethylene (TFE), which is obtained by polymerizing the above monomers in the presence of a diiodide compound of the formula:

wherein R is a saturated fluorohydrocarbon or chlorofluorohydrocarbon group having 1 to 16 carbon atoms or a hydrocarbon group having 1 to 3 carbon atoms, contains iodine atoms introduced in the copolymer from the iodine compounds of the formulas (1) and (2) in amounts of 0.01 to 1 wt. % and 0.01 to 2 wt. %, respectively, and has a Mooney viscosity ($ML_{1+10}^{100°}$ C.) of 20 to 150.

The fluororubber copolymer of the present invention has excellent compression set in a wide temperature range from low temperature to high temperature, and also good properties of the conventional iodine-containing fluororubber such as heat resistance, chemical resistance, solvent resistance, oil resistance, curing properties, and dry physical properties.

DETAILED DESCRIPTION OF THE INVENTION

In the present invention, an amount of the VdF units in the fluororubber copolymer is from 40 to 90 mole %, preferably from 50 to 85 mole %. When the amount of the VdF units is less than 40 mole %, the glass transition temperature of the copolymer becomes high so that the cold resistance is deteriorated. When the amount of the VdF units exceeds 90 mole %, the amorphous state of the copolymer is impaired so that the rubbery elasticity greatly decreases.

An amount of the PMVE units in the copolymer is from 3 to 35 mole %, preferably from 5 to 25 mole %. When the amount of the PMVE units is less than 3 mole %, the cold resistance of the copolymer is severely deteriorated. When the amount of PMVE units exceeds 35 mole %, the production cost of the copolymer increases since PMVE is expensive.

In the fluororubber copolymer of the present invention, the iodine-containing fluorinated vinyl ether of the formula (2) is one of the essential constituents. Specific examples of the iodine-containing fluorinated vinyl ether are $ICH_2CF_2CF_2OCF=CF_2$, $I(CH_2CF_2CF_2O)_2CF=CF_2$, $I(CH_2CF_2CF_2O)_3CF=CF_2$, $ICH_2CF_2OCT(CF_3)-CF_2OCF=CF_2$, $ICH_2CF_2CF_2O[CF(CF_3)CF_2O]_2CF=CF_2$, and the like. Among them, $ICH_2CF_2CF_2OCF=CF_2$ is preferred.

An amount of the iodine atoms to be introduced in the copolymer from the iodine-containing fluorinated vinyl ether is from 0.01 to 2 wt. % (calculated from the weight of the iodine-containing fluorinated vinyl ether added during the polymerization) based on the whole weight of the copolymer. The iodine-containing fluorinated vinyl ether is copolymerized with other fluoroolefins, whereby the iodine atoms are introduced in the copolymer.

The iodine atoms function as crosslinking sites in the curing reaction of the copolymer. Accordingly, when the amount of the iodine atoms which are introduced in the copolymer from the iodine-containing fluorinated vinyl ether is less than 0.01 wt. % based on the whole weight of the copolymer, a crosslinking density is small, so that the high compression set in the wide temperature range cannot be imparted to the molded article. When this amount of the iodine atoms exceeds 2 wt. %, the crosslinking density becomes too high, so that the elongation at break of the molded article is decreased.

The fluororubber copolymer of the present invention may contain 25 mole % or less, preferably 0 to 15 mole % of the HFP units. When the amount of the HFP units exceed 25 mole %, the cold resistance of the copolymer is deteriorated.

Further, the fluororubber copolymer of the present invention may contain 40 mole % or less, preferably 0 to 20 mole % of the TFE units. When the amount of the TFE units exceeds 40 mole the cold resistance of the copolymer is deteriorated.

When the copolymer of the present invention is a terpolymer consisting of VdF, PMVE and the iodine-containing fluorinated vinyl ether of the formula (2), the amounts of the VdF units and the PMVE units in the terpolymer are from 65 to 90 mole % and from 10 to 35 mole %, respectively. When the amount of the VdF units is less than 65 mole %, the cold resistance tends to be deteriorated. When the amount of the VdF units exceeds 90 mole %, the amorphous state of the copolymer is impaired, so that the rubbery elasticity is greatly decreased. When the amount of the PMVE units is less than 10 mole %, the amorphous state of the copolymer may be impaired, so that the rubbery elasticity tends to decrease. When the amount of the PMVE units exceeds 35 mole %, the production cost of the copolymer increases since PMVE is expensive.

When copolymer of the present invention is a tetrapolymer consisting of VdF, PMVE, TFE and the iodine-containing fluorinated vinyl ether of the formula (2), the amounts of the VdF units, the PMVE units and the TFE units are from 40 to 80 mole %, from 15 to 35 mole % and from 3 to 40 mole %, respectively. When the amount of the VdF units is less than 40 mole %, the cold resistance is deteriorated. When the amount of the VdF units exceeds 80 mole %, the amorphous state of the copolymer may be impaired, so that the rubbery elasticity tends to decrease. When the amount of the PMVE units is less than 15 mole %, the cold resistance tends to decrease.. When the amount of the PMVE units exceeds 35 mole %, the production cost of the copolymer is expensive. When the amount of the TFE units is less than 3 mole %, the VdF units tend to be crystallized, and then the PMVE units should be increased, whereby the production cost of the copolymer increases. When the amount of the TFE units exceeds 40 mole %, the cold resistance is deteriorated.

When the copolymer is a tetrapolymer consisting of VdF, PMVE, HFP and the iodine-containing fluorinated vinyl ether of the formula (2), the amounts of the VdF units, the PMVE units and the HFP units are from 65 to 90 mole %, from 3 to 25 mole % and from 3 to 25 mole %, respectively. When the amount of the VdF units is less than 65 mole %, the cold resistance tends to be deteriorated. When the amount of the VdF units exceeds 90 mole %, the amorphous state of the copolymer is impaired, so that the rubbery elasticity heavily decreases. When the amount of the PMVE units is less than 3 mole %, the cold resistance is deteriorated. When the amount of the PMVE units exceeds 25 mole %, the production cost of the copolymer tends to increase since PMVE is expensive. When the amount of the HFP units is less than 3 mole %, the VdF units tend to be crystallized, and then the PMVE units should be increased, whereby the production cost of the copolymer increases. When the amount of the HFP units exceeds 25 mole %, the cold resistance is deteriorated.

When the copolymer is a pentapolymer consisting of VdF, PMVE, HFP, TFE and the iodine-containing fluorinated vinyl ether of the formula (2), the amounts of the VdF units, the PMVE units, the HFP units and the TFE units are from 40 to 80 mole %, from 3 to 25 mole %, from 3 to 25 mole %, and from 3 to 40 mole %, respectively. When the amount of the VdF units is less than 40 mole %, the cold resistance is deteriorated. When the amount of the VdF units exceeds 80 mole %, the amorphous state of the copolymer may be impaired, so that the rubbery elasticity tends to decrease. When the amount of the PMVE units is less than 3 mole %, the cold resistance is deteriorated. When the amount of the PMVE units exceeds 25 mole %, the production cost of the copolymer tends to increase since PMVE is expensive. When the amount of the HFP units is less than 3 mole %, the VdF units tend to be crystallized, and then the PMVE units should be increased, whereby the production cost of the copolymer tends to increase. When the amount of the HFP units exceeds 25 mole %, the cold resistance is deteriorated. When the amount of the TFE units is less than 3 mole %, the VdF units tend to be crystallized, and then the PMVE units should be increased, whereby the production cost of the copolymer tends to increase. When the amount of the TFE units exceeds 40 mole %, the cold resistance is deteriorated.

The fluororubber copolymer of the present invention is obtained by radically polymerizing the above monomers in the presence of the diiodide compound of the formula (1), and the amount of the iodine atoms which are introduced in the copolymer from the diiodide compound of the formula (1) is from 0.01 to 1 wt. (calculated from the weight of the diiodide compound added during the polymerization) based on the whole weight of the copolymer.

The amount of the diiodide compound in the copolymer has a decisive significance on the determination of the molecular weight of the copolymer since the diiodide compound functions as a chain transfer agent as described in JPA-53-125491. Further, the introduced iodine atoms function as crosslinking sites. Therefore, when the amount of the iodine atoms to be introduced in the copolymer from the diiodide compound of the formula (1) is less than 0.01 wt. %, the molecular weight of the copolymer becomes too large so that the flowability of the copolymer in the curing reaction is deteriorated, and the crosslinking density becomes too small so that the molded article does not exhibit sufficient tensile strength at break. When the amount of such iodine atoms exceeds 1 wt. %, the molecular weight becomes too small so that the kneading of the rubber is made difficult.

The fluororubber copolymer of the present invention has the Mooney viscosity ($ML_{1+10}100°$ C.) of 20 to 150. The Mooney viscosity is measured by a method defined in JIS K 6300, "Mooney Viscosity Measurement", and a measuring temperature is 100° C. When the Mooney viscosity is less than 20, the kneading of the rubber is made difficult, while when it exceeds 150, the flowability of the copolymer in the curing reaction is lost.

The copolymer of the present invention may be prepared by the method described in Examples 12-15 of JP-A-62-12734 with changing the kinds and amounts of the monomers.

That is, VdF, PMVE and the iodine-containing fluorinated vinyl ether, and optionally HFP and TFE are radically emulsion polymerized in an aqueous medium in the presence of the diiodide compound substantially in the absence of oxygen under elevated pressure while stirring.

Typical examples of the diiodide compound to be used in the preparation of the copolymer of the present invention are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, and 1,2-diiodoethane. They may be used independently or in combination thereof. Among them, 1,4-diiodoperfluorobutane is preferred. The diiodide compound is used in an amount of 0.1 to 2 wt. % based on the whole weight of the copolymer.

A radical polymerization initiator to be used in the preparation of the random copolymer according to the present invention can be the same as one used in the preparation of the conventional fluoroelastomers. The polymerization initiator includes organic and inorganic peroxides and azo compounds. Typical polymerization initiators are persulfates, peroxycarbonates, peroxy esters, and the like, and a preferred polymerization initiator is ammonium persulfate (APS). APS may be used alone or in combination with a reducing agent such as a sulfite ester, a sulfite salt, etc.

An amount of the polymerization initiator to be added in the polymerization is preferably as small as possible in view of the properties of the obtained copolymer. But, when the amount of the polymerization initiator is very small, the polymerization rate is decreased to cause the deterioration of the productivity. Therefore, the amount of the polymerization initiator should be suitably adjusted. In general, the polymerization initiator is used in an amount of 5 to 50 mole % based on the amount of the diiodide compound.

As an emulsifier used in the emulsion polymerization to prepare the copolymer of the present invention, a wide variety of emulsifier can be used. Preferably, a salt of a carboxylic acid having a fluorocarbon chain or a fluoropolyether chain from the view point of suppressing the chain transfer reaction onto emulsifier molecules during the polymerization.

Specific examples of the emulsifier are $C_7F_{15}COONH_4$, $C_8F_{17}COONH_4$, $CF_3CF_2CF_2OCH(CF_3)COONH_4$, $CF_3CF_2CF_2OCF(CF_3)$-$CF_2OCF(CF_3)COONH_4$, $CF_3CF_2CF_2O[CF(CF_3)CF_2O]_2CF(CF_3)COONH_4$, $CF_3CF_2CF_2O[CF(CF_3)CF_2O]_3CF(CF_3)COONH_4$, and so on.

An amount of the emulsifier is preferably from about 0.05 to 1 wt. %, in particular, from 0.1 to 0.5 wt. % based on the weight of water added to a reaction system.

A polymerization temperature is selected from a wide temperature range depending on the kind of the polymerization initiator and the use of the reducing agent. In general, the polymerization temperature is from 0° to 130° C. When APS alone is used as the polymerization initiator, a temperature in the range between 50° C. and 90° C. is preferred. When the polymerization temperature is lower than this range, the polymerization rate considerably lowers.

A polymerization pressure is selected from a wide pressure range. In general, a pressure in the range between 0.2 MPa and 0.8 MPa is employed. As the polymerization pressure increases, the polymerization rate increases. Then, in view of the productivity, the preferred polymerization pressure is 1.0 MPa or higher.

The copolymer of the present invention can be crosslinked by various crosslinking sources and cured (vulcanized) to provide the fluororubber. As the crosslinking source, an organic peroxide is preferably used, while radiation (e.g. α-rays, β-rays, γ-rays, electron beams, X-rays, etc.), high energy electromagnetic wave such as UV light, and so on may be used.

An amount of the organic peroxide is from 0.05 to 10 wt. parts, preferably 1.0 to 5 wt. parts per 100 wt. parts of the copolymer.

As the organic peroxide, one that generates a peroxide radical easily in the presence of heat or a redox system is preferred. Examples of such organic peroxide are 1,1-bis(tert.-butyl-peroxy)-3,5,5-trimethyicyclohexane, 2,5-dimethylhexane-2,5-dihydroperoxide, di-tert.-butyl peroxide, tert.-butylcumyl peroxide, dicumyl peroxide, α,α-bis(tert.-butylperoxy)-p-diisopropylbenzene, 2,5-dimethyl-2,5-di(tert.-butylperoxy)hexane, 2,5-dimethyl-2,5-di(tert.-butylperoxy)-hexine-3, benzoylperoxide, tert.-butylperoxybenzene, 2,5-dimethyl-2,5-di(benzoylperoxy)hexane, tert.-butyl peroxymaletate, tert.-butyl peroxyisopropylcarbonate, and so on. Among them, the dialkyl type one, in particular, 2,5-dimethyl-2,5-di(tert.-butylperoxy)hexane is preferred. The kind and amount of the organic peroxide are selected by taking into account an amount of an active —O—O— group, a decomposition temperature, and so on.

When the organic peroxide is used, a crosslinking aid may be used in combination, whereby the copolymer is cured considerably. Any crosslinking aid can be used in principle, as long as it has a reactivity with the peroxy radical and a polymer radical, and a kind of the crosslinking aid is not limited. Preferred examples of the crosslinking aid are triallyl cyanurate, triallyl isocyanurate, triacryl formal, triallyl trimellitate, N,N'-m-phenylene bismaleimide, dipropargyl terephthalate, diallyl phthalate, tetraallyl terephthalamide, triallyl phosphate, and so on. Among them, triallyl isocyanurate is particularly preferred.

An amount of the crosslinking aid is preferably from 0.1 to 10 wt. parts, more preferably from 0.5 to 5 wt. parts.

In the crosslinking step, other rubber or material may be blended and co-crosslinked with the copolymer of the present invention. Examples of the rubber or material to be co-crosslinked are silicone oil, silicone rubber, ethylene-vinyl acetate copolymer, 1,2-polybutadiene, fluorosilicone oil, fluorosilicone rubber, fluoro-phosphazene rubber, hexafluoropropylene-ethylene copolymer, tetrafluoroethylene-propylene copolymer, and other polymers having a radical reactivity. An amount of the other rubber or material is not limited, but should not be larger enough to deteriorate the inherent properties of the copolymer of the present invention in principle.

In addition, the composition of the present invention may contain an additive which is used together with the conventional fluororubber such as a pigment which colors the copolymer, a filler, a reinforcing agent, and so on. As the widely used filler or reinforcing agent, there are exemplified carbon black, $TIO_2$, $SIC_2$, clay and talc as inorganic ones, and fluoropolymers (e.g. polytetrafluoroethylene, polyvinylidene fluoride, polyvinyl fluoride, polychlorotrifluoroethylene, tetrafluoroethylene/ethylene copolymer, tetrafluoroethylene/vinylidene fluoride copolymer, etc.) as organic ones.

To compound the above curing components, a suitable method is selected according to viscoelasticities and states of the materials. In general, a conventional open roll mill or a powder mixer is used. Alternatively, it is possible to dissolve or disperse the solid materials in a solvent, and then mix and disperse the components.

A curing temperature and time depend on the kind of the peroxide to be used. In general, press curing is performed at a temperature of 120° to 200° C. for 5 to 30 minutes, and oven curing is performed at a temperature of 150° to 250° C. for 1 to 24 hours.

The copolymer of the present invention is advantageously used as a general molding material, a sealant, an adhesive or a paint in a field which requires cold resistance, heat resistance, oil resistance, chemical resistance and solvent resistance. Preferable applications of the molded article are sealing members such as an O-ring, a lip-type packing, an oil seal, a diaphragm, a gasket, a V-ring, and so on.

EXAMPLES

The present invention will be illustrated by the following examples, which do not limit the present invention in any way.

Example 1

In a 2.6 liter autoclave made of SUS 316 stainless steel, pure water (1.0 l), $C_7F_{15}COONH_4$ (2.0 g) as an emulsifier, disodium hydrogenphosphate (0.09 g) as a pH adjuster were charged, and an interior was thoroughly replaced with nitrogen gas. Then, the mixture was heated to 80° C. while stirring at 600 rpm, and a monomer mixture of VdF and perfluoro(methyl vinyl ether) (PMVE) (a molar ratio of 66:34) was injected till an internal pressure rose to 1.57 MPa. Thereafter, 4 ml of an aqueous solution of APS (5 mg/ml) was charged under the nitrogen pressure to initiate the reaction.

As the polymerization reaction progressed, the pressure dropped. When the pressure dropped to 1.47 MPa, $I(CF_2)_4I$ (1.2 g) as the diiodide compound was injected, and then a monomer mixture of VdF and PMVE (a molar ratio of 80:20) was further injected to increase the pressure to 1.57 MPa. With repeating the pressure drop and increase, the above APS aqueous solution (each 2 ml) was charged under the nitrogen pressure every three hours to continue the reaction.

When the total pressure drop reached 2.55 MPa from the start of the polymerization reaction (after 5 hours), an iodine-containing fluorinated vinyl ether: $ICH_2CF_2CF_2OCF=CF_2$ (hereinafter referred to as "IM1") (1.8 g) was injected. When the total pressure drop reached 5.10 MPa (after 9 hours), the autoclave was cooled, and the unreacted monomers were discharged to obtain an aqueous emulsion having a solid content of 29.9 wt. %.

To the aqueous emulsion, a 5 wt. % aqueous solution of potassium alum was added to coagulate the polymer. The coagulate polymer was washed with water and dried to obtain a rubbery polymer (403 g). This polymer had the Mooney viscosity ($ML_{1+10}100°$ C.) of 96.

According to the results of $^{19}F$-NMR analysis, the monomeric composition of this polymer was found to be 78.8 mole % of VdF, 21.1 mole % of PMVE and 0.1 mole % of IM1.

Example 2

In the same manner as in Example 1 except that a molar ratio of the monomer mixture of VdF/TFE/PMVE to be charged at the start of the polymerization was 75/5/25, a molar ratio of the monomer mixture of VdF/TFE/PMVE to be used to repressurize the autoclave after the pressure drop was 75/7/18, and the reaction time was 5 hours, the reaction was performed to obtain a rubbery copolymer (400 g). This polymer had the Mooney viscosity of 73.

According to the results of 19F-NMR analysis, the monomeric composition of this polymer was found to be 73.9 mole % of VdF, 7.0 mole % of TFE, 19.0 mole % of PMVE and 0.1 mole % of IM1.

Example 3

In the same manner as in Example 1 except that a molar ratio of the monomer mixture of VdF/HFP/PMVE to be charged at the start of the polymerization was 60/26/14, a molar ratio of the monomer mixture of VdF/HFP/PMVE to be used to repressurize the autoclave after the pressure drop was 78/11/11, and the reaction time was 8.5 hours, the reaction was performed to obtain a rubbery copolymer (380 g). This polymer had the Mooney viscosity of 73.

According to the results of $^{19}F$-NMR analysis, the monomeric composition of this polymer was found to be 77.9 mole % of VdF, 11.5 mole % of HFP, 10.5 mole % of PMVE and 0.1 mole % of IM1.

Example 4

In the same manner as in Example 1 except that a molar ratio of the monomer mixture of VdF/TFE/HFP/PMVE to be charged at the start of the polymerization was 5914/26/11, a molar ratio of the monomer mixture of VdF/TFE/HFP/PMVE to be used to repressurize the autoclave after the pressure drop was 7319/9/9, and the reaction time was 7 hours, the reaction was performed to obtain a rubbery copolymer (380 g). This polymer had the Mooney viscosity of 62.

According to the results of $^{19}F$-NMR analysis, the monomeric composition of this polymer was found to be 70.7 mole % of VdF, 9.2 mole % of TFE, 10.4 mole % of HFP, 9.6 mole % of PMVE and 0.1 mole % of IM1.

Example 5

In the same manner as in Example 1 except that a molar ratio of the monomer mixture of VdF/TFE/PMVE to be charged at the start of the polymerization was 65/6/29, a molar ratio of the monomer mixture of VdF/TFE/PMVE to be used to repressurize the autoclave after the pressure drop was 71/9/20, a total amount of IM1 was 7.2 g and equally divided amounts of IM1 were injected after 2.5, 3.1, 3.7 and 4.3 hours from the start of the reaction, and the reaction time was 5 hours, the reaction was performed to obtain a rubbery copolymer (393 g). This polymer had the Mooney viscosity of 41.

According to the results of $^{19}$F-NMR analysis, the monomeric composition of this polymer was found to be 68.5 mole % of VdF, 8.9 mole % of TFE, 22.1 mole % of PMVE and 0.5 mole % of IM1.

Example 6

In the same manner as in Example 1 except that an added diiodide compound was I(CF$_2$)$_6$I, its amount was 2.95 g, a molar ratio of the monomer mixture of VdF/TFE/PMVE to be charged at the start of the polymerization was 55/10/35, a molar ratio of the monomer mixture of VdF/TFE/PMVE to be used to repressurize the autoclave after the pressure drop was 58/18/24, and the reaction time was 5 hours, the reaction was performed to obtain a rubbery copolymer (405 g). This polymer had the Mooney viscosity of 33.

According to the results of $^{19}$gF-NMR analysis, the monomeric composition of this polymer was found to be 57.4 mole % of VdF, 18.1 mole % of TFE, 24.4 mole % of PMVE and 0.1 mole % of IM1.

Example 7

In the same manner as in Example 1 except that a compound of the formula: ICH$_2$CF$_2$CF$_2$OCF(CF$_3$)CF$_2$OCF=CF$_2$ (hereinafter referred to as "IM2") (2.7 g) was used as an iodine-containing fluorinated vinyl ether to be copolymerized, a molar ratio of the monomer mixture of VdF/TFE/PMVE to be charged at the start of the polymerization was 70/5/25, a molar ratio of the monomer mixture of VdF/TFE/PMVE to be used to repressurize the autoclave after the pressure drop was 75/7/18, and the reaction time was 5 hours, the reaction Was performed to obtain a rubbery copolymer (390 g). This polymer had the Mooney viscosity of 63.

According to the results of $^{19}$gF-NMR analysis, the monomeric composition of this polymer was found to be 73.5 mole % of VdF, 7.4 mole % of. TFE, 19.0 mole % of PMVE and 0.1 mole % of IM2.

Example 8

In the same manner as in Example 7 except that a molar ratio of the monomer mixture of VdF/TFE/HFP/PMVE to be charged at the start of the polymerization was 63/4/15/18, a molar ratio of the monomer mixture of VdF/TFE/HFP/PMVE to be used to repressurize the autoclave after the pressure drop was 73/9/5/13, and the reaction time was 8 hours, the reaction was performed to obtain a rubbery copolymer (385 g). This polymer had the Mooney viscosity of 80.

According to the results of $^{19}$F-NMR analysis, the monomeric composition of this polymer was found to be 73.4 mole % of VdF, 8.6 mole % of TFE, 5.0 mole % of HFP, 12.9 mole % of PMVE and 0.1 mole % of IM2.

Comparative Example 1

In the same manner as in Example 2 except that no IM1 was used, the reaction was performed to obtain a copolymer (354 g). This polymer had the Mooney viscosity of 74.

According to the results of $^{19}$gF-NMR analysis, the monomeric composition of this polymer was found to be 74.9 mole % of VdF, 6.4 mole % of TFE and 18.7 mole % of PMVE.

Comparative Example 2

In the same manner as in Example 4 except that no IM1 was used, the reaction was performed to obtain a copolymer (381 g). This polymer had the Mooney viscosity of 108.

According to the results of $^{19}$F-NMR analysis, the monomeric composition of this polymer was found to be 70.1 mole % of VdF, 9.5 mole % of TFE, 10.0 mole % of HFP and 10.4 mole % of PMVE.

Comparative Example 3

In the same manner as in Example 8 except that no IM1 was used, the reaction was performed to obtain a copolymer (379 g). This polymer had the Mooney viscosity of 85.

According to the results of $^{19}$F-NMR analysis, the monomeric composition of this polymer was found to be 73.1 mole % of VdF, 9.1 mole % of TFE, 4.7 mole % of HFP and 13.1 mole % of PMVE.

Comparative Example 4

In the same manner as in Example 1 except that a molar ratio of the monomer mixture of VdF/TFE/HFP to be charged at the start of the polymerization was 48/8/44, a molar ratio of the monomer mixture of VdF/TFE/PMVE to be used to repressurize the autoclave after the pressure drop was 65/18/17 and the reaction time was 15 hours, the reaction was performed to obtain a rubbery copolymer (385 g). This polymer had the Mooney viscosity of 70.

According to the results of $^{19}$F-NMR analysis, the monomeric composition of this polymer was found to be. 67.0 mole % of VdF, 16.4 mole % of TFE, 16.5 mole % of HFP and 0.1 mole % of IM1.

Evaluation of properties

With each of the copolymers obtained in Examples and Comparative Examples, the components shown in Tables 1 and 2 were compounded to prepare a curing composition, and its curing property was measured using a Curastometer (JIS II type) at 160° C.

The composition was cured under a press curing condition of 160° C. for 10 minutes, and an oven curing condition of 180° C. for 4 hours, and physical properties of the cured material were measured. The physical properties of the cured material were measured according to JIS K 6301.

The results are shown in Tables 1 and 2. In Tables, "parts" are "wt. parts".

TABLE 1

|  | Ex. 1 | Ex. 2 | Ex. 3 | Ex. 4 | Ex. 5 | Ex. 6 |
| --- | --- | --- | --- | --- | --- | --- |
| Copolymer (parts) | 100 | 100 | 100 | 100 | 100 | 100 |
| MT-carbon (parts) | 20 | 20 | 20 | 20 | 20 | 20 |
| Triallyl isocyanurate (parts) | 4 | 4 | 4 | 4 | 4 | 4 |

TABLE 1-continued

|  |  | Ex. 1 | Ex. 2 | Ex. 3 | Ex. 4 | Ex. 5 | Ex. 6 |
|---|---|---|---|---|---|---|---|
| 2,5-Dimethyl-2,5-di(tert.-butyl-peroxy)hexane (parts) | | 1.5 | 1.5 | 1.5 | 1.5 | 1.5 | 1.5 |
| Minimum viscosity (kg) | | 0.34 | 0.20 | 0.20 | 0.15 | 0.12 | 0.10 |
| Curing degree (kg) | | 3.60 | 4.11 | 4.75 | 4.58 | 4.39 | 4.01 |
| Induction time (min.) | | 0.6 | 0.6 | 0.7 | 0.6 | 0.6 | 0.6 |
| Optimum curing time (min.) | | 1.4 | 1.4 | 1.5 | 1.4 | 1.7 | 1.4 |
| 100% Modulus (kg/cm$^2$) | | 40 | 39 | 38 | 40 | 100 | 40 |
| Tensile strength (kg/cm$^2$) | | 216 | 193 | 209 | 208 | 191 | 191 |
| Elongation (%) | | 280 | 260 | 260 | 280 | 170 | 260 |
| Hardness (JIS A) | | 65 | 67 | 67 | 68 | 69 | 68 |
| TR test | TR 10 | −33 | −31 | −27 | −25 | −30 | −22 |
| Compression set | 200° C. × 70 hrs | 20 | 17 | 20 | 21 | 21 | 22 |
| (P-24 O-ring) | 25° C. × 70 hrs | 9 | 8 | 10 | 10 | 6 | 10 |
| (%) | −20° C. × 22 hrs | 20 | 24 | 30 | 29 | 24 | 38 |

TABLE 2

|  |  | Ex. 7 | Ex. 8 | C. Ex. 1 | C. Ex. 2 | C. Ex. 3 | C. Ex. 4 |
|---|---|---|---|---|---|---|---|
| Copolymer (parts) | | 100 | 100 | 100 | 100 | 100 | 100 |
| MT-carbon (parts) | | 20 | 20 | 20 | 20 | 20 | 20 |
| Triallyl isocyanurate (parts) | | 4 | 4 | 4 | 4 | 4 | 4 |
| 2,5-Dimethyl-2,5-di(tert.-butyl-peroxy)hexane (parts) | | 1.5 | 1.5 | 1.5 | 1.5 | 1.5 | 1.5 |
| Minimum viscosity (kg) | | 0.15 | 0.25 | 0.20 | 0.40 | 0.30 | 0.19 |
| Curing degree (kg) | | 4.02 | 4310 | 4.18 | 5.00 | 4.04 | 4.20 |
| Induction time (min.) | | 0.6 | 0.6 | 0.7 | 0.6 | 0.7 | 0.6 |
| Optimum curing time (min.) | | 1.4 | 1.6 | 1.6 | 2.0 | 1.4 | 1.8 |
| 100% Modulus (kg/cm$^2$) | | 40 | 39 | 27 | 26 | 24 | 41 |
| Tensile strength (kg/cm$^2$) | | 195 | 210 | 205 | 193 | 206 | 210 |
| Elongation (%) | | 260 | 270 | 340 | 350 | 350 | 270 |
| Hardness (JIS A) | | 68 | 68 | 67 | 65 | 67 | 69 |
| TR test | TR 10 | −31 | −29 | −31 | −25 | −29 | −21 |
| Compression set | 200° C. × 70 hrs | 19 | 18 | 29 | 30 | 25 | 18 |
| (P-24 O-ring) | 25° C. × 70 hrs | 8 | 9 | 13 | 19 | 12 | 7 |
| (%) | −20° C. × 22 hrs | 27 | 27 | 38 | 42 | 40 | 50 |

EFFECTS OF THE INVENTION

The fluororubber copolymer of the present invention has excellent compression set in a wide temperature range from the low temperature to the high temperature while maintaining the excellent properties of the conventional fluororubbers. In addition, a molded article produced from the curing composition of the present invention is useful as a sealing material.

What is claimed is:

1. A copolymer comprising monomeric units of 0.005 to 1.5 mole % of an iodine-containing fluorinated vinyl ether of the formula:

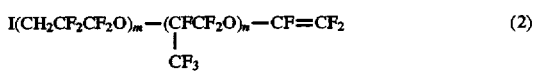

wherein m is an integer of 1 to 5, and n is an integer of 0 to 3, 40 to 90 mole % of vinylidene fluoride, 3 to 35 mole % of perfluoro(methyl vinyl ether), 0 to 25 mole % of hexafluoropropylene and 0 to 40 mole % of tetrafluoroethylene, which is obtained by polymerizing the above monomers in the presence of a diiodide compound of the formula:

wherein R is a saturated fluorohydrocarbon or chlorofluorohydrocarbon group having 1 to 16 carbon atoms or a hydrocarbon group having 1 to 3 carbon atoms, wherein said copolymer contains iodine atoms introduced in the copolymer from the iodine compounds of the formulas (1) and (2) in amounts of 0.01 to 1 wt. % and 0.01 to 2 wt. %, respectively, and wherein said copolymer has a Mooney viscosity (ML$_{1+10}$100° C.) of 20 to 150.

2. The fluororubber copolymer according to claim 1, wherein said monomeric units comprise: 0.005 to 1.5 mole % of the iodine-containing fluorinated vinyl ether of the formula (2), 65 to 90 mole % of vinylidene fluoride and 10 to 35 mole % of perfluoro(methyl vinyl ether).

3. The fluororubber copolymer according to claim 1, wherein said monomeric units comprise: 0.005 to 1.5 mole % of the iodine-containing fluorinated vinyl ether of the formula (2), 40 to 80 mole % of vinylidene fluoride, 15 to 35 mole % of perfluoro-(methyl vinyl ether) and 3 to 40 mole % of tetrafluoroethylene.

4. The fluororubber copolymer according to claim 1, wherein said monomeric units comprise: 0.005 to 1.5 mole % of the iodine-containing fluorinated vinyl ether of the formula (2), 65 to 90 mole % of vinylidene fluoride, 3 to 25 mole % of perfluoro(methylvinyl ether) and 3 to 25 mole % of hexafluoropropylene.

5. The fluororubber copolymer according to claim 1, wherein said monomeric units comprise: 0.005 to 1.5 mole % of the iodine-containing fluorinated vinyl ether of the formula (2), 40 to 80 mole % of vinylidene fluoride, 3 to 25 mole % of perfluoro-(methyl vinyl ether), 3 to 25 mole % of hexafluoropropylene and 3 to 40 mole % of tetrafluoroethylene.

6. A curing composition comprising 100 wt. parts of the copolymer as claimed in claim 1, 0.05 to 10 wt. parts of an organic peroxide and 0.1 to 10 wt. parts of a cross-linking aid.

7. The curing composition according to claim 6, wherein said organic peroxide is a dialkyl peroxide.

8. The curing composition according to claim 6, wherein said organic peroxide is 2,5-dimethyl-2,5-di(tert.-butylperoxy)-hexane.

9. The curing composition according to claim 6, wherein said crosslinking aid is triallyl isocyanurate.

10. A sealing material prepared from a composition as claimed in claim 6.

* * * * *